(12) United States Patent  
Clapper

(10) Patent No.: US 7,836,049 B2  
(45) Date of Patent: Nov. 16, 2010

(54) SYLLABIC SEARCH ENGINES AND RELATED METHODS

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1571 days.

(21) Appl. No.: 10/020,483

(22) Filed: Dec. 12, 2001

(65) Prior Publication Data

US 2003/0120846 A1 Jun. 26, 2003

(51) Int. Cl.
G06F 7/00 (2006.01)
G06F 17/30 (2006.01)

(52) U.S. Cl. .................................. 707/728; 707/736
(58) Field of Classification Search .................. 707/1–3, 707/10, 8, 100, 5, 6; 704/265, 9, 10, 206
See application file for complete search history.

(56) References Cited

U.S. PATENT DOCUMENTS

| | | | | |
|---|---|---|---|---|
| 5,765,152 A | * | 6/1998 | Erickson | 707/9 |
| 5,832,478 A | * | 11/1998 | George | 707/3 |
| 5,991,756 A | * | 11/1999 | Wu | 707/3 |
| 6,408,266 B1 | * | 6/2002 | Oon | 704/1 |
| 6,629,092 B1 | * | 9/2003 | Berke | 707/3 |
| 6,687,689 B1 | * | 2/2004 | Fung et al. | 707/3 |
| 6,689,946 B2 | * | 2/2004 | Funaki | 84/478 |
| 6,862,568 B2 | * | 3/2005 | Case | 704/260 |

* cited by examiner

*Primary Examiner*—Cam Y T Truong
(74) *Attorney, Agent, or Firm*—Schwegman, Lundberg & Woessner, P.A.

(57) ABSTRACT

An improved search engine, for a computing device or computer network, utilizes search strings comprising complete words and numbers representing a syllable count for each unknown word. Pattern-matching algorithms are utilized to search a document database for documents that match the input search strings. The document database is constructed by analyzing a number of documents, utilizing document-analyzing algorithms. In one embodiment, each database record comprises a document that has been analyzed into one or more groups of word sequences. Each word sequence comprises an ordered list of words in the word sequence, as well as a corresponding ordered list of the syllable count for each word in the word sequence. The syllabic search engine can be implemented in different ways, such as through a software application, operating system, network software, or a custom software module. Improved computers and computer networks for providing a syllabic search function are also described.

26 Claims, 6 Drawing Sheets

SYLLABIC SEARCH ENGINES AND RELATED METHODS

TECHNICAL FIELD

The inventive subject matter relates generally to the field of data processing and, more particularly, to a search engine for finding information via a sequence of syllable counts.

BACKGROUND INFORMATION

Search engines are known computer-based programs for finding desired information. Various Internet search engines, such as AltaVista and Google, are well known. Other search engines exist for different applications, e.g. search-and-find functions for applications such as word processors, spreadsheets, and data base managers.

Known search engines look for text strings or phrases that match one that is input by a computer user. When a match is successfully made, the known search engine returns a list of "hits" containing the input text string. However, known search engines do not perform well when searching for phrases having missing or incorrectly sequenced information, such as missing words, missing letters, or misspelled words.

When a computer user is attempting to find a desired document based upon a phrase or text string, the computer user may not know the complete phrase and may know only isolated words separated by unknown words. Or the computer user may know all of the words but not know the correct spelling of some or all of the words.

For the reasons stated above, and for other reasons stated below which will become apparent to those skilled in the art upon reading and understanding the present specification, there is a significant need in the art for systems and methods that support computer-based searching through the utilization of incomplete phrases and phrases containing misspelled words.

DETAILED DESCRIPTION

In the following detailed description of embodiments of the invention, reference is made to the accompanying drawings that form a part hereof, and in which is shown by way of illustration specific preferred embodiments in which the inventive subject matter may be practiced. These embodiments are described in sufficient detail to enable those skilled in the art to practice them, and it is to be understood that other embodiments may be utilized and that logical, procedural, mechanical, and electrical changes may be made without departing from the spirit and scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of the inventive subject matter is defined only by the appended claims.

The inventive subject matter provides a syllabic search function for locating desired documents stored within computing devices and/or computer networks. Various embodiments are illustrated and described herein. According to one embodiment, an improved search engine for a computing device or computer network utilizes a search string comprising in addition to known words, numbers representing a syllable count for each unknown or uncertain word. One or more pattern-matching algorithms are utilized to search a document database for any document that matches the input search string.

The document database is constructed by analyzing a number of documents, utilizing document-analyzing algorithms. In one embodiment, each database record comprises a document that has been analyzed into one or more groups of word sequences. Each word sequence comprises an ordered list of words in the word sequence, as well as a corresponding ordered list of the syllable count for each word in the word sequence. The syllabic search engine can be implemented in different ways, such as through a software application, an operating system, network software, or a custom software module. Improved computers and computer networks for providing a syllabic search function are also described.

The term "syllable", as used herein, means a segment of speech typically produced with a single pulse of air pressure from the lungs. By way of example, the word "bit" has a single syllable; the word "data" has two syllables; the word "computer" has three syllables; and so on.

Search engines built in accordance with the inventive subject matter can effectively and quickly locate documents which otherwise could not be located, and they can significantly increase the commercial value of computer software, computer systems, and/or computer networks in which they are featured.

Figure 1:
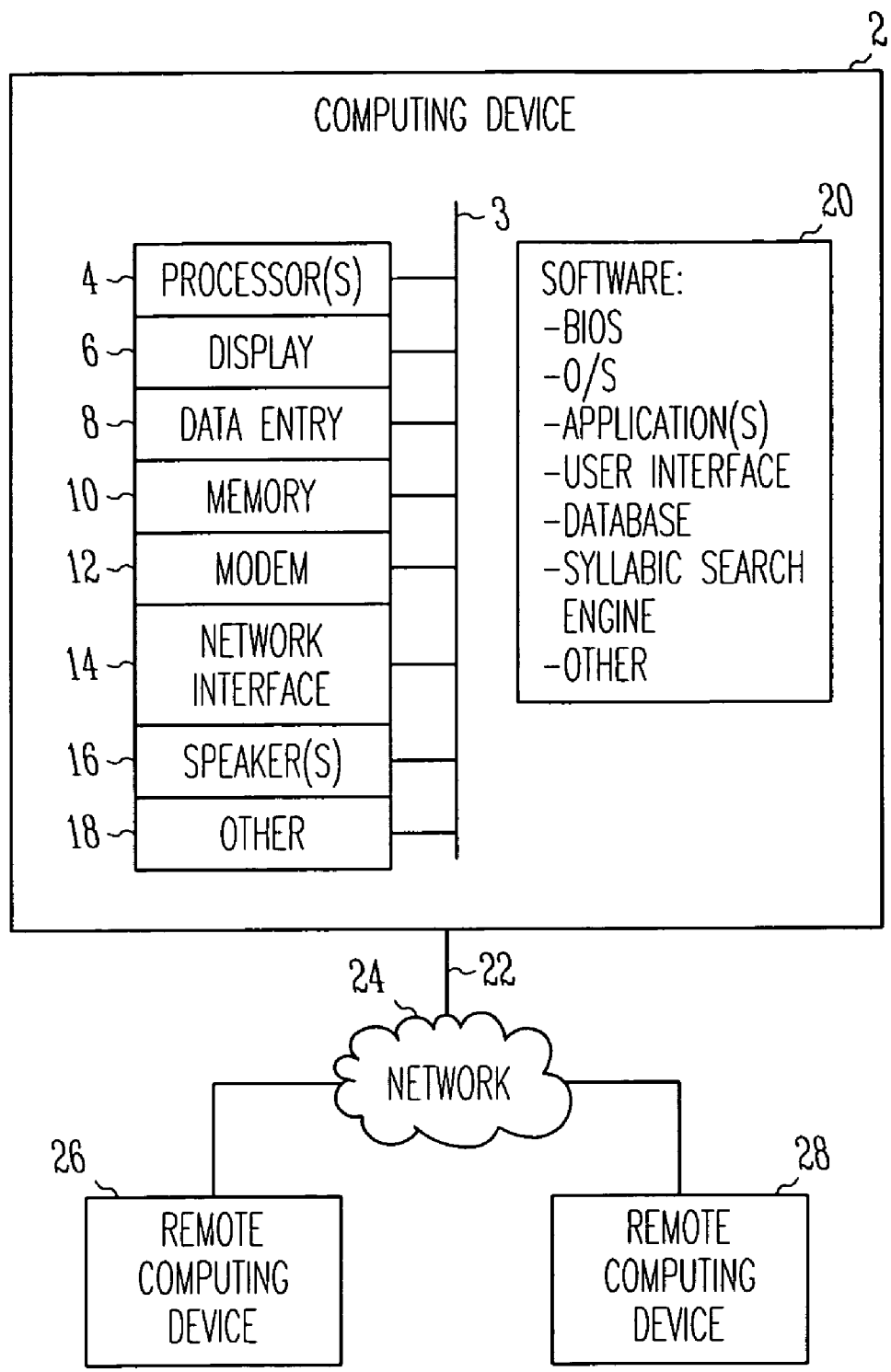
FIG. 1 illustrates a block diagram of a computing device, and of an optional computer network comprising remote computing devices, that either individually or collectively can provide a syllabic search function, in accordance with one embodiment of the invention.

FIG. 1 illustrates a block diagram of a computing device 2, and of an optional computer network 24 comprising remote computing devices 26 and 28, that either individually or collectively can provide a syllabic search function, in accordance with one embodiment of the invention.

FIG. 1 and the following discussion are intended to provide a brief, general description of a suitable computing environment in which certain aspects of the illustrated inventive subject matter may be implemented. An exemplary system to provide a syllabic search function includes a machine or computing device 2 having system bus 3. Typically, attached to bus 3 are one or more processors 4, a display 6, and one or more data entry elements 8 such as a keyboard, mouse, trackball, joy stick, touch-sensitive screen, or other well-known user interface data entry element(s). Also attached to bus 3 is a memory 10, which can include any suitable memory device (s) like read only memory (ROM); random access memory (RAM); hard drive; removable media drive for handling compact disks (CDs), digital video disks (DVDs), diskettes, magnetic tape cartridges, and other types of data storage; or the like. Additional elements can also be attached to bus 3 such as a modem 12, a network interface unit 14, one or more speakers 16, and other suitable devices 18.

"Processor", as used herein, means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit. The term also includes embedded controllers, such as Generic or Programmable Logic Devices or Arrays, Application Specific Integrated Circuits, single-chip computers, smart cards, and the like.

"Suitable", as used herein, means having characteristics that are sufficient to produce the desired result(s). Suitability for the intended purpose can be determined by one of ordinary skill in the art using only routine experimentation.

Computing device 2 can optionally operate in a networked environment using a physical and/or a logical connection 22 to one or more remote computing devices or systems 26 and 28 via wired or wireless network 24. Network 24 can be an intranet; the Internet; a local area network; a wide area network; a cellular, cable, laser, satellite, microwave, "Blue Tooth", optical, or infrared network; or any other short-range or long-range wired or wireless network.

The inventive subject matter may be implemented in conjunction with program modules, including functions, procedures, data structures, application programs, etc. for performing tasks, or defining abstract data types or low-level hardware contexts. Program modules may be stored in memory 10 and associated storage media, e.g., hard-drives, floppy-disks, optical storage, magnetic cassettes, tapes, flash memory cards, memory sticks, digital video disks, chemical storage, and/or biological storage. Program modules may be delivered over transmission environments, including network 24, in the form of packets, serial data, parallel data, propagated signals, etc. Program modules may be used in a compressed or encrypted format, and they may be used in a distributed environment and stored in local and/or remote memory, for access by single and multi-processor machines, portable computers, handheld devices (e.g., Personal Digital Assistants (PDAs)), cellular telephones, pagers, personal entertainment devices (e.g. digital music players, digital video players, etc.), one-way or two-way radios, or the like.

Thus, for example, with respect to the illustrated embodiments, assuming that computing device 2 provides a syllabic search engine capability, then one or both of remote computing devices 26 and 28 may be configured like computing device 2, and they can include many or all of the elements discussed for computing device 2. One of remote computing devices 26 and 28 could also be a server comprising software for providing a syllabic search engine capability to computer users of computing device 2 and other computing devices coupled to network 24. It should also be appreciated that while devices 2, 26, and 28 are typically separate communicatively-coupled components they could be embodied within a single device.

Computing device 2 can be any type of computer or computer-based display for displaying information, such as an Internet appliance; a personal computer; a pay-for-use computer located in an Internet cafe, hotel, or the like; an electronic book or other device for displaying information; a pager; a cellular telephone; a palm-top computer; a notebook computer; a laptop computer; or the like.

Devices 2, 26, and 28 can further comprise a plurality of types of software programs. For example, computing device 2 can comprise software 20 that includes a basic input/output system (BIOS), operating system (O/S) software, one or more software applications, a user interface, one or more databases including a document database, a syllabic search engine, and any other types of software as required to perform the operational requirements of computing device 2.

Figure 2:
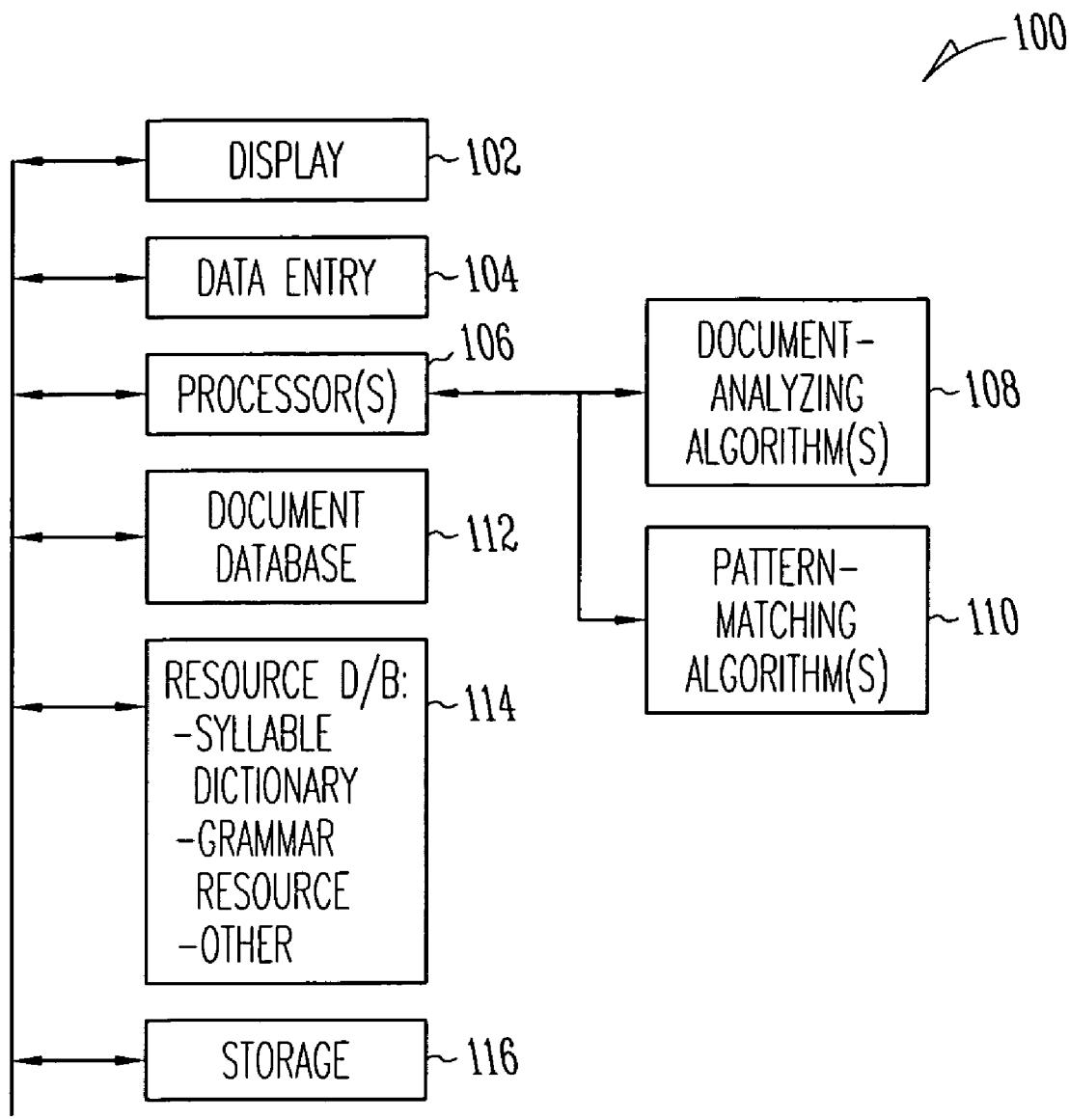
FIG. 2 illustrates a block diagram of elements of a computing device that provides a syllabic search function, in accordance with one embodiment of the invention.

FIG. 2 illustrates a block diagram of elements of a computing device 100 that provides a syllabic search function, in accordance with one embodiment of the invention.

Computing device 100 comprises a display 102 of any suitable type, such as a cathode ray tube (CRT) display, liquid crystal display, plasma display, or the like.

A data entry element 104 can be of any suitable type(s), such as a keyboard, pointing device (e.g. a mouse, trackball, joy stick, touch pad, touch sensitive screen, etc.), voice-recognition mechanism, or the like.

Processor 106 can be of any type, including those mentioned earlier regarding the description of FIG. 1.

Still referring to FIG. 2, processor 106 can access document-analyzing algorithm(s) 108 and pattern-matching algorithm(s) 110, which reside in any suitable machine-accessible media, such as any type(s) of memory 10 mentioned earlier regarding the description of FIG. 1. One of ordinary skill in the art is capable of writing suitable computer program instructions, for storage on suitable machine-accessible media, which when accessed by a processor or other computational machine result in documents being analyzed as described latter herein, and result in a search string input by a computer user being pattern-matched with search strings stored in a document database to retrieve the identity of one or more matching documents.

Still referring to FIG. 2, a document database 112 can be implemented with any suitable database software program. A resource database 114 includes a suitable syllable dictionary that provides a syllable count for each of a large number of words in the particular language being used by the user of the computing device. The syllable dictionary can, if desired, also include multiple entries for certain words having alternative correct pronunciations, such as "real", which can be pronounced with either one or two syllables. Resource database 114 can also include, if desired, a grammar resource to assist in resolving pattern matching, and it can also include other resources, such as foreign language dictionaries or special purpose dictionaries, such as scientific, medical, legal, pharmaceutical, financial, or other types of dictionaries.

Memory storage 116 can be any type(s) of memory 10 mentioned earlier regarding the description of FIG. 1. Storage 116 can be used, for example, as temporary storage during processing.

Computing device 100 can also comprise additional elements (not shown), such as a printer, modem, network interface, speaker(s), and/or other components or peripherals.

Figure 3A:
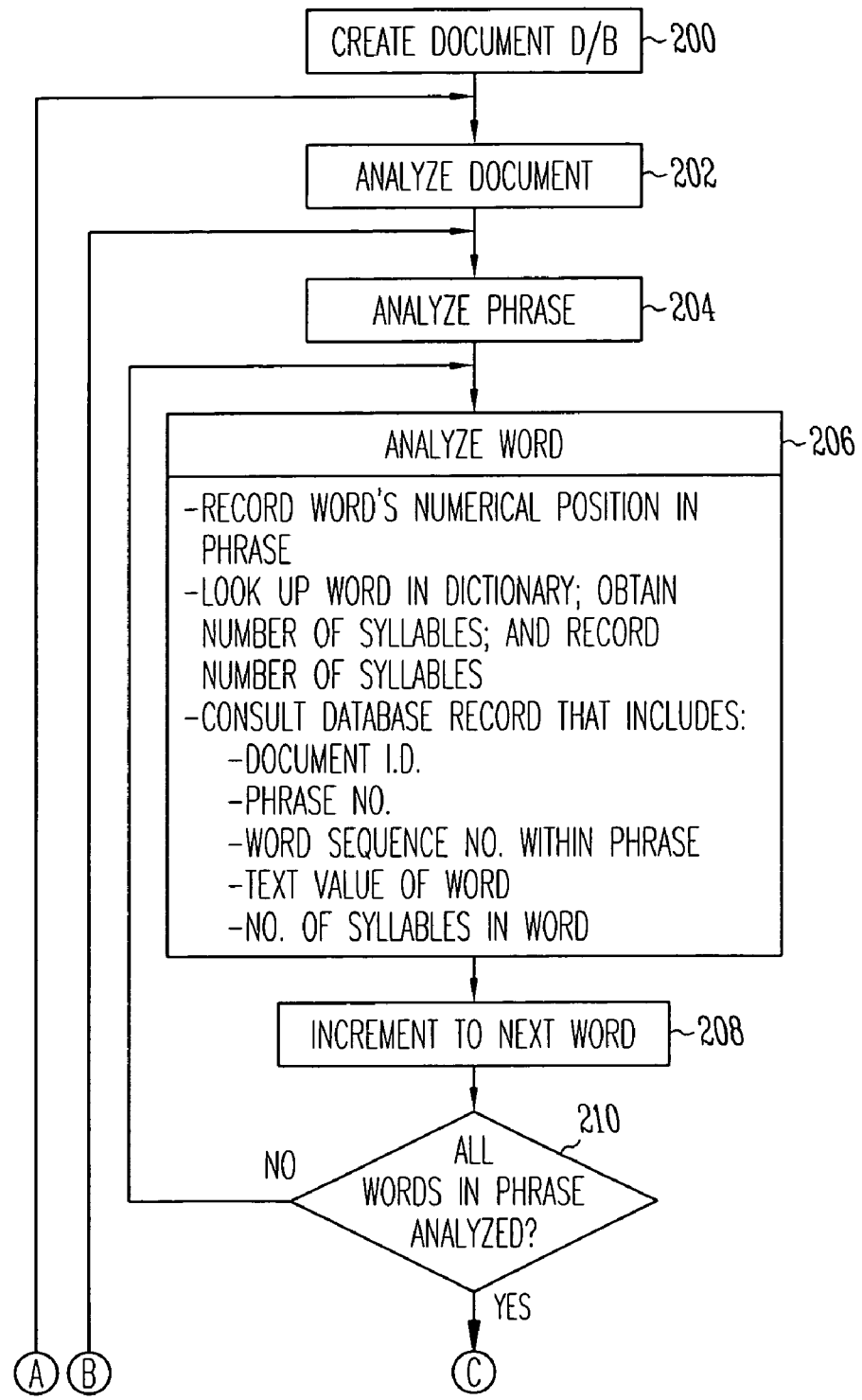
FIGS. 3A and 3B together illustrate a flow diagram of a method of creating a syllabic document database, which method is implemented in a computer system, in a computer network, or in a computational machine operating under control of instructions residing on a machine-accessible medium, in accordance with various embodiments of the invention.
Figure 3B:
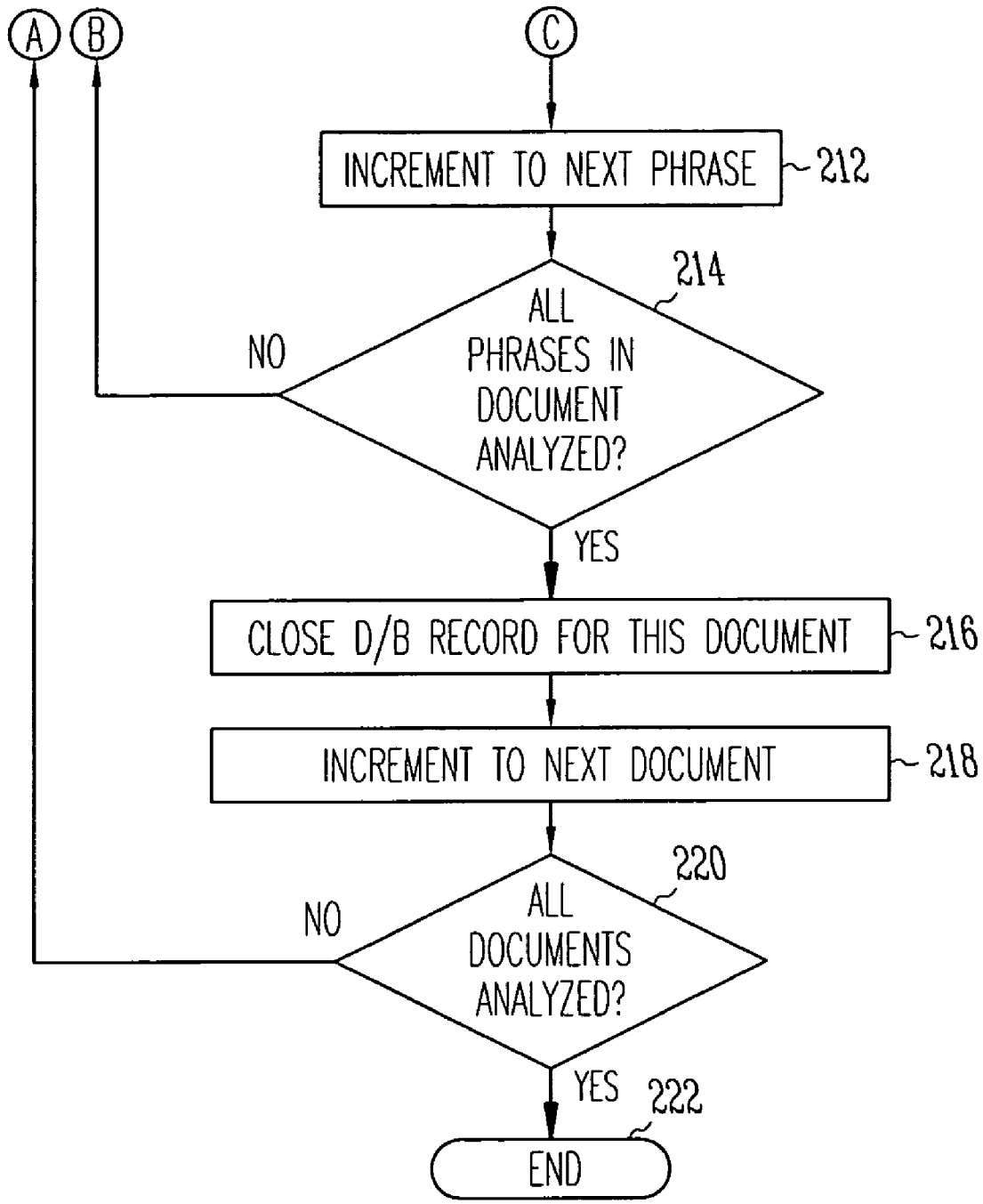

FIGS. 3A and 3B together illustrate a flow diagram of a method 200 of creating a syllabic document database, which method is implemented in a computer system, in a computer network, or in a computational machine operating under control of instructions residing on a machine-accessible medium, in accordance with various embodiments of the invention. The method is merely one example of creating a database of analyzed documents, each comprising an ordered sequence of words, with each word having an associated syllable count. Many other implementations are also possible, as will be apparent to those of ordinary skill in the art.

In 202, a document is selected for analysis. A document can be of any type such as, but not limited to, any work of authorship as defined in Title 17 (United States Copyright Code) Section 101, "Definitions", or the legal equivalent. These include literary works, song lyrics, dramatic works, motion picture scripts, and audiovisual scripts. Documents can also include uncopyrightable works of any type, as well as works on which copyrights have expired.

In one embodiment, the inventive subject matter is used to identify a song title based on a search string that includes nothing more than an ordered sequence of syllable counts from the song lyric. In another embodiment, one or more known words can also be input as part of the ordered sequence of syllable counts, in place of the syllable count(s) for such known word(s). In yet another embodiment, the inventive subject matter is used to identify a movie or television episode based upon a search string from the dialog. In further embodiments, a search string can be used to identify a speech from a database containing speech documents; to retrieve a poem title from a database of poetry; to identify a book title from a quotation; and the like.

A document can also be synonymous with a file, such as a file containing text, an email, a message to a pager or cellular telephone, an Internet page, etc.

Each document can be assigned a unique document identifier, such as a number or alphanumeric label.

In 204, the first phrase in the document is analyzed. In some embodiments, a document may comprise only a single phrase. In other embodiments wherein the document comprises a plurality of phrases, the document may be parsed into a number of phrases in any suitable manner. For example, if the document is a song lyric, each line can be considered a phrase; alternatively, each stanza and the chorus can be considered a phrase. If the document is a book, each sentence can be considered a phrase. Each phrase can be assigned a sequential phrase number, if desired, to identify the order of the phrase within the document.

In 206, the first word in the first phrase is analyzed. The word's numerical position within the phrase is recorded. This can be done, for example, by assigning a word sequence number, e.g. the number "1", to the first word, and so forth for successive words.

The first word is looked up in the syllable dictionary to obtain the number of syllables, and this number is recorded for the first word.

A database record is constructed that may include the following recorded information: the document identifier, the phrase number, the word sequence number within the phrase, the text value of the word, and the syllable count for the word. Each record comprises an ordered listing of words, and an ordered syllable count listing.

In 208, the process increments to the next word when analysis has been completed on the preceding word.

In 210, a determination is made whether all words in the phrase have been analyzed. If so, the process goes to 212; otherwise, it returns to 206.

In 212, the process increments to the next phrase when analysis has been completed on the preceding phrase.

In 214, a determination is made whether all phrases in the document have been analyzed. If so, the process goes to 216; otherwise, it returns to 204.

In 216, the database record for this particular document is closed.

In 218, the process increments to the next document.

In 220, a determination is made whether all documents requiring analysis have been analyzed. If so, the process finishes at 222; otherwise, it returns to 202.

Figure 4:
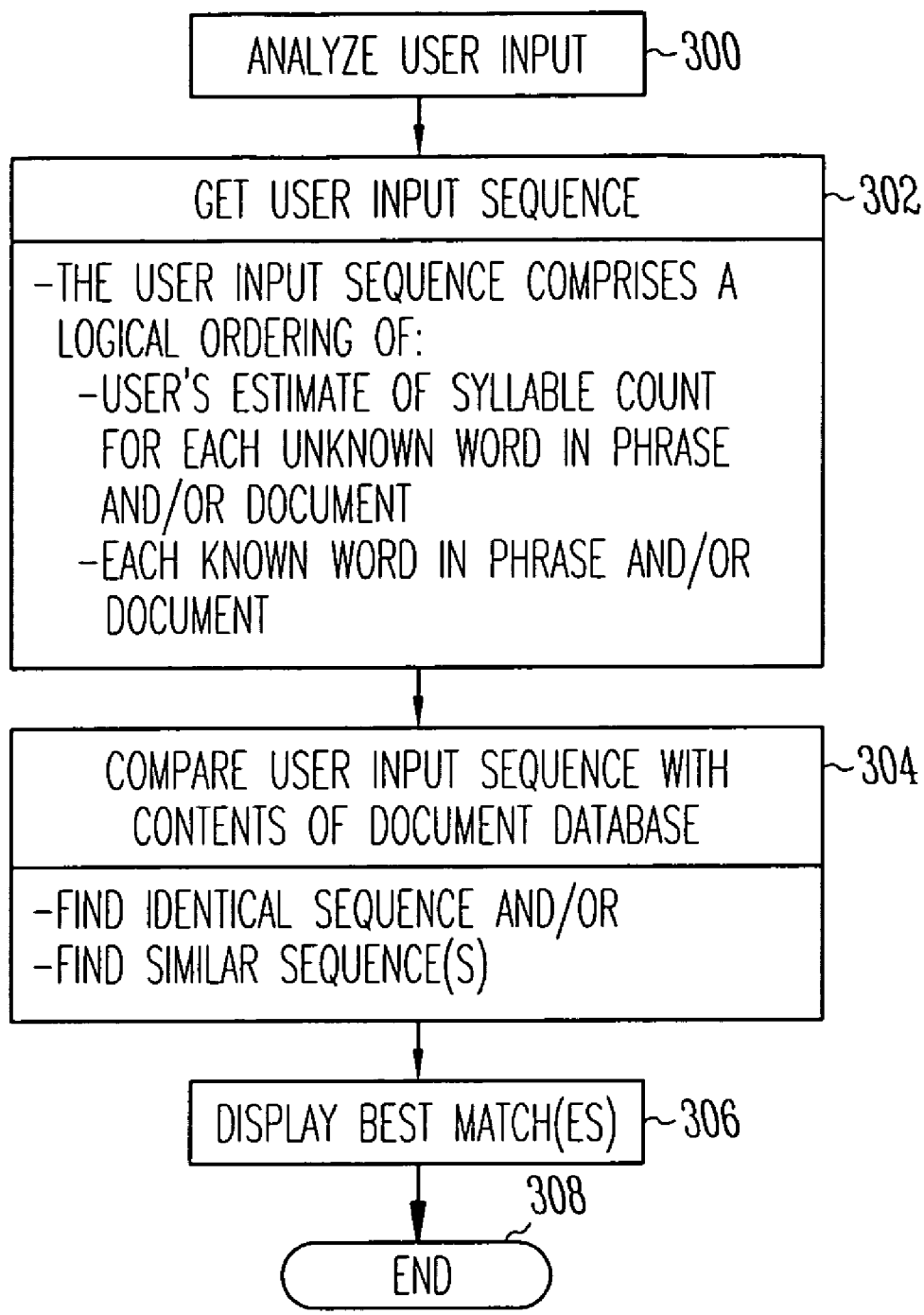
FIG. 4 illustrates a flow diagram of a method of performing a syllabic search based upon user input, which method is implemented in a computer system, in a computer network, or in a computational machine operating under control of instructions residing on a machine-accessible medium, in accordance with various embodiments of the invention.

FIG. 4 illustrates a flow diagram of a method 300 of performing a syllabic search based upon user input, which method is implemented in a computer system, in a computer network, or in a computational machine operating under control of instructions residing on a machine-accessible medium, in accordance with various embodiments of the invention. The method is merely one example of utilizing a user-provided search string, comprising an ordered sequence of syllable counts, and optionally one or more known words, to search a document database to retrieve the identification of a desired document. Many other implementations are also possible, as will be apparent to those of ordinary skill in the art.

In 302, the user input sequence or search string is obtained. The user input sequence comprises a logical ordering of the user's estimate of the syllable count for each unknown word in the desired phrase and/or document. The user input sequence can optionally also include one or more known words of the phrase and/or document. An example of this is provided regarding FIG. 5 to be discussed below.

Still with reference to FIG. 4, in 304, the user input sequence or search string is compared with the contents of the document database that was created using, for example, the process illustrated in FIGS. 3A and 3B. A suitable algorithm can be used to perform this match, such as one or more pattern-matching algorithms. In this manner, an identical match may be found. Or, if an identical match is not found, one or more documents may be identified having similar but not identical search strings to the user's input, enabling the user to evaluate which, if any, satisfy the user's search.

In one embodiment, the algorithm can include a checksum calculation with respect to the number of syllables in the user input sequence (i.e. the total number of syllables in the known words and in the syllable counts for unknown words), in order to cull out retrieved search strings having a syllable count exceeding a given margin of error. For example, if the checksum count of the number of syllables in the user input sequence is 25, and if the predetermined allowable margin of error is set at plus or minus 10 syllables, then retrieved search strings having fewer than 15 or more than 35 syllables, for example, could be automatically eliminated and not displayed to the user.

In 306, the identity of the retrieved document(s) is displayed on a display of the computing device. If a number of potential "hits" have been retrieved, a suitable algorithm can prioritize them according to the degree of match achieved, and a list of the best-matched hits can be displayed. The process ends at 308.

Figure 5:
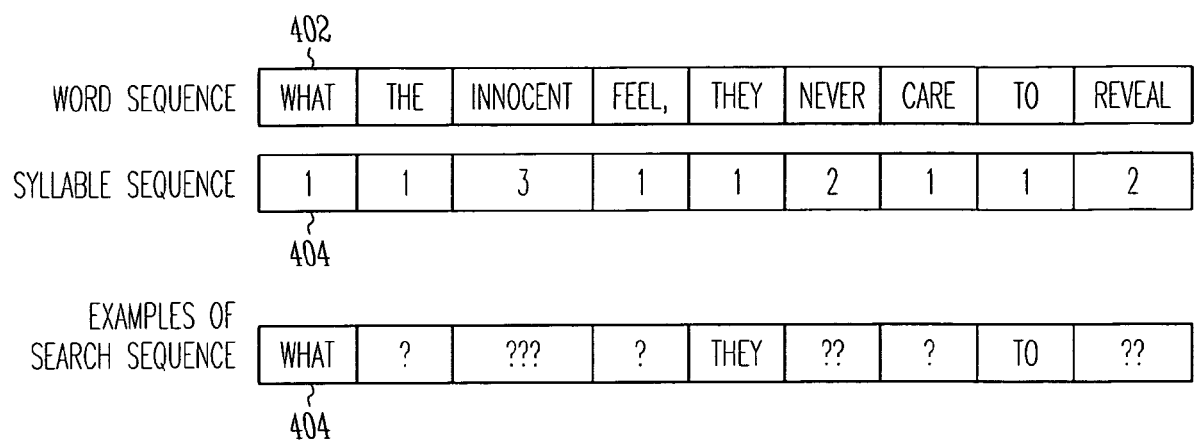
FIG. 5 illustrates a word sequence, a corresponding syllabic sequence, and an example of a syllabic search sequence, in accordance with various embodiments of the invention.

FIG. 5 illustrates a word sequence, a corresponding syllabic sequence, and an example of a syllabic search sequence, in accordance with various embodiments of the invention. In the example illustrated in FIG. 5, an exemplary word sequence 402 is a phrase or stanza from a song lyric: "What the innocent feel, they never care to reveal".

A corresponding syllabic sequence 404 is shown by the numerical sequence: 1, 1, 3, 1, 1, 2, 1, 1, 2. Each number represents the syllable count for the corresponding word in word sequence 402. For example, the word "What" has 1 syllable; the word "the" has 1 syllable; the word "innocent" has 3 syllables; and so on.

An example of a user search string or search sequence 406 is the sequence: what, ?, ???, ?, they, ??, ?, to, ??, wherein each "?" represents the number of syllables perceived by the user. If the user were unable to understand any word of the song phrase, the user could input just a syllable sequence, e.g. ?, ?, ???, ?, ?, ??, ?, ?, ??.

Any suitable user interface can be used to interpret the user search string and to convert it into a digital format that is suitable for conducting a comparison search on the document database.

By comparing sequences of syllable counts, possibly interspersed with known words, a relatively small number of numerical digits in a sequence, or possibly a single-digit total, can be used to locate a matching sequence without the expenditure of large amounts of processing power and/or time that would be required to compare strings of alphanumeric characters.

Moreover, the inventive subject matter is tolerant of missing words, groups of words, or of all words in a user's search string, provided that every missing word is replaced with a corresponding syllable count in the same order as the word appears within the phrase or document. If a conventional search engine were used on only easily understood words, such as "Mississippi", "computer", "music", it would return an enormous number of potential "hits", whereas the inventive subject matter can narrow the number of hits considerably if syllable counts are substituted for unknown words.

The inventive subject matter also is tolerant of misspelled words in the user search string. A conventional search engine can retrieve a large quantity of false hits if a search string contains a misspelled word, whereas the inventive subject matter need not give significant weight to misspelled words and can give proportionally greater weight to sequences of syllable counts. In addition, the user can substitute a syllable count for any word whose spelling the user is uncertain about.

In addition, the inventive subject matter could be used as a supplement or background to a conventional search engine, in order to improve the quality of its searches.

It should be understood that the operations shown in FIGS. 3A, 3B, and 4 are merely representative and not exclusive, and that many other different alternative operations could be implemented using the concepts taught by the inventive subject matter.

The operations described above with respect to the methods illustrated in FIGS. 3A, 3B, and 4 can be performed in a different order from those described herein. Also, it will be understood that although the methods are described as having an "end", they could be continuously performed.

Implementing a syllabic search engine is carried out by suitable instructions in one or more computer programs that are stored in and executed by one or more devices 2, 26, and 28 in FIG. 1. One of ordinary skill in the art is capable of writing suitable instructions to implement the objectives and features of the inventive subject matter as described herein.

The inventive subject matter provides a syllabic search function for locating desired documents within computing devices and/or computer networks. Various embodiments have been illustrated and described herein. According to one embodiment, an improved search engine, for a computing device or computer network, utilizes a search string comprising, in addition to known words, numbers representing a syllable count for each unknown or uncertain word. One or more pattern-matching algorithms are utilized to search a document database for a document that matches the input search string.

The document database is constructed by analyzing a number of documents, utilizing document-analyzing algorithms. In one embodiment, each database record comprises a document that has been analyzed into one or more groups of word sequences. Each word sequence comprises an ordered list of words in the word sequence, as well as a corresponding ordered list of the syllable count for each word in the word sequence. A syllabic search engine can be implemented in different ways, such as in a software application, in an operating system, through network software, or in a custom software module. Improved computers and computer networks for providing a syllabic search function have also been described.

Search engines built in accordance with the inventive subject matter can effectively and quickly locate documents which otherwise could not be located, and they can significantly increase the commercial value of computer software, computer systems, and/or computer networks in which they are featured.

Other embodiments will be readily apparent to those of ordinary skill in the art. The elements, architecture, and sequence of operations can all be varied to suit particular data security requirements.

The various elements depicted in the drawings are merely representational and are not drawn to scale. Certain proportions thereof may be exaggerated, while others may be minimized. The drawings are intended to illustrate various implementations of the inventive subject matter, which can be understood and appropriately carried out by those of ordinary skill in the art.

Having described and illustrated the principles of the inventive subject matter with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment", "in another embodiment", or the like are used herein, these phrases are meant to generally reference embodiment possibilities, and they are not intended to limit the inventive subject matter to particular embodiment configurations. As used herein, these terms may reference the same or different embodiments that are combinable into other embodiments.

Consequently, in view of the wide variety of permutations to the embodiments described herein, this detailed description is intended to be illustrative only, and it should not be taken as limiting the scope of the inventive subject matter.

Although specific embodiments have been illustrated and described herein, it will be appreciated by those of ordinary skill in the art that any arrangement or process that is calculated to achieve the same purpose may be substituted for the specific embodiments shown. This application is intended to cover any adaptations or variations of the inventive subject matter. Therefore, it is manifestly intended that embodiments of this inventive subject matter be limited only by the claims and the equivalents thereof.

What is claimed is:

1. A method comprising:
   a computing device receiving a search string including an ordered sequence of syllable counts;
   comparing the ordered sequence of syllable counts with the contents of a database of analyzed documents, each document comprising a plurality of words; and retrieving from the database a document uniquely represented by the search string.

2. The method recited in claim 1 wherein, in receiving, the search string includes a word in place of the word's syllable count.

3. The method recited in claim 1 wherein, in receiving, the search string includes two words in place of each respective word's syllable count.

4. The method recited in claim 1 wherein, in using, the database comprises a plurality of records, each comprising an ordered listing of words and an ordered syllable count listing.

5. The method recited in claim 4 wherein, in using, each database record comprises a work from the group comprising a literary work, a song lyric, a dramatic work, a motion picture script, and an audiovisual script.

6. The method recited in claim 1 wherein, in using, the input ordered sequence of syllable counts is matched with at least one corresponding ordered sequence of syllable counts within the database.

7. The method recited in claim 1 wherein the computing device comprises a display, and wherein the method further comprises:
displaying the document via the display.

8. The method recited in claim 7 wherein, in using, a plurality of documents are retrieved, and wherein the method further comprises:
displaying the plurality of documents via the display.

9. A computing device including a memory to store a database, and a user interface, the computing device executing a computer program comprising the operations of:
receiving via the user interface a search string including an ordered sequence of syllable counts;
comparing the ordered sequence of syllable counts with the contents of the database, the database comprising a plurality of analyzed documents, each document comprising a plurality of words; and
retrieving from the database a document uniquely represented by the search string.

10. The computing device recited in claim 9 wherein, in receiving, the search string includes a word in place of the word's syllable count.

11. The computing device recited in claim 9 wherein, in using, the database comprises a plurality of records, each comprising an ordered listing of words and an ordered syllable count listing.

12. The computing device recited in claim 11 wherein, in using, each database record comprises a work from the group comprising a literary work, a song lyric, a dramatic work, a motion picture script, and an audiovisual script.

13. The computing device recited in claim 9 wherein, in using, the input ordered sequence of syllable counts is matched with at least one corresponding ordered sequence of syllable counts within the database.

14. The computing device recited in claim 9 wherein the computer program further comprises the operation of:
displaying the document via the user interface.

15. The computing device recited in claim 14 wherein, in using, a plurality of documents are retrieved, and wherein the computer program further comprises the operation of:
displaying the plurality of documents via the display.

16. A computer network including a computing device having a user interface, and a remote computing device having a remote memory to store a database and a computer program, the computer network executing the computer program and comprising the operations of:
receiving via the user interface a search string including an ordered sequence of syllable counts;
comparing the ordered sequence of syllable counts with the contents of the database, the database comprising a plurality of analyzed documents, each document comprising a plurality of words; and
retrieving from the database a document uniquely represented by the search string.

17. The computer network recited in claim 16 wherein, in receiving, the search string includes a word in place of the word's syllable count.

18. The computer network recited in claim 16 wherein, in using, the database comprises a plurality of records, each comprising an ordered listing of words and an ordered syllable count listing.

19. The computer network recited in claim 18 wherein, in using, each database record comprises a work from the group comprising a literary work, a song lyric, a dramatic work, a motion picture script, and an audiovisual script.

20. The computer network recited in claim 16 wherein, in using, the input ordered sequence of syllable counts is matched with at least one corresponding ordered sequence of syllable counts within the database.

21. The computer network recited in claim 16 wherein the computer program further comprises the operation of:
displaying the document via the user interface.

22. The computer network recited in claim 21 wherein, in using, a plurality of documents are retrieved, and wherein the computer program further comprises the operation of:
displaying the plurality of documents via the display.

23. An article comprising a non-transitory machine-accessible medium having associated instructions, wherein the instructions, when accessed, result in a machine performing:
receiving a search string including an ordered sequence of syllable counts;
comparing the ordered sequence of syllable counts with the contents of a database of analyzed documents, each document comprising a plurality of words; and
retrieving from the database a document uniquely represented by the search string.

24. The article of claim 23 wherein, in using, a pattern-matching algorithm matches the input ordered sequence of syllable counts with at least one corresponding ordered sequence of syllable counts within the database.

25. The article of claim 23 wherein the machine comprises a display, and wherein the instructions, when accessed, result in the machine performing:
displaying the document via the display.

26. The article of claim 23 wherein the machine comprises a display;
wherein, in using, a plurality of documents are retrieved; and
wherein the instructions, when accessed, result in the machine performing:
generating a list of best-matched hits; and
displaying the list of best-matched hits via the display.

* * * * *